United States Patent
Li

(12) United States Patent (10) Patent No.: US 7,529,550 B2
Li (45) Date of Patent: May 5, 2009

(54) METHOD OF PROVIDING LOCATION SERVICE FOR WLAN USER

(75) Inventor: Zhiming Li, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 226 days.

(21) Appl. No.: 11/178,083

(22) Filed: Jul. 8, 2005

(65) Prior Publication Data

US 2005/0272440 A1 Dec. 8, 2005

Related U.S. Application Data

(63) Continuation of application No. PCT/CN2004/000032, filed on Jan. 12, 2004.

(30) Foreign Application Priority Data

Jan. 10, 2003 (CN) ................................ 03 1 01150

(51) Int. Cl.
*H04Q 7/20* (2006.01)
(52) U.S. Cl. ................ 455/456.1; 455/461; 455/456.3; 455/456.6; 455/458; 455/464
(58) Field of Classification Search ................ 370/342; 455/456.5, 456.1, 461, 456.3, 456.6, 458, 455/464

See application file for complete search history.

(56) References Cited

U.S. PATENT DOCUMENTS

| | | | |
|---|---|---|---|
| 2002/0118665 A1 | 8/2002 | Cleveland et al. | 370/342 |
| 2004/0023669 A1* | 2/2004 | Reddy | 455/456.1 |
| 2004/0147254 A1* | 7/2004 | Reddy et al. | 455/456.1 |
| 2004/0203873 A1* | 10/2004 | Gray | 455/456.1 |

(Continued)

FOREIGN PATENT DOCUMENTS

EP 1 130 933 A1 9/2001

(Continued)

OTHER PUBLICATIONS

"Technical Specification Group Services and System Aspects; Feasibility Study on 3GPP System to Wireless Local Area Network (WLAN) Interworking (Release)", 3GPP TR 22.934, V6.2.0, 2003.

(Continued)

*Primary Examiner*—Vincent P Harper
*Assistant Examiner*—Fred A Casca
(74) *Attorney, Agent, or Firm*—Marshall, Gerstein & Borun LLP

(57) ABSTRACT

A method of providing location service for Wireless Local Area Network (WLAN) subscribers. With a location subsystem preset in the WLAN and the WLAN subscribers accessing to a 3G network, the method comprises at least the steps of the WLAN location subsystem detecting whether it has received a location request from an LCS client in the 3G network, if yes, locating the target UE based on the received location request and returning the location result to the Gateway Mobile Location Center (GMLC), which will forward the location result to the LCS client; otherwise, continuing to detect whether it receives the location request. The solution provided by the method makes it possible for LCS clients to apply via the 3G network the LCS in the WLAN inter-working with the 3G network.

14 Claims, 6 Drawing Sheets

U.S. PATENT DOCUMENTS

| | | | |
|---|---|---|---|
| 2004/0233866 A1* | 11/2004 | Bossoli et al. | 370/328 |
| 2005/0181776 A1* | 8/2005 | Verma et al. | 455/418 |
| 2005/0286461 A1* | 12/2005 | Zhang et al. | 370/328 |
| 2006/0058045 A1* | 3/2006 | Nilsen | 455/456.5 |
| 2006/0178154 A1* | 8/2006 | Farmer | 455/456.1 |

FOREIGN PATENT DOCUMENTS

| | | |
|---|---|---|
| EP | 1 158 826 A2 | 11/2001 |
| WO | WO 00/76171 A1 | 12/2000 |
| WO | WO 02/15598 | 2/2002 |

OTHER PUBLICATIONS

International Search Report in PCT/CN2004/000032 dated May 27, 2004.

* cited by examiner

METHOD OF PROVIDING LOCATION SERVICE FOR WLAN USER

CROSS-REFERENCE TO RELATED APPLICATION

This is a continuation of International Application No. PCT/CN04/00032 filed Jan. 12, 2004, the entire disclosure of which is incorporated herein by reference.

BACKGROUND OF THE INVENTION

1. Field of the Invention

The invention relates generally to Location Finding technology for Wireless Local Area Network (WLAN) subscribers and, in particular, the invention relates to a method of providing location services for WLAN subscribers in a WLAN inter-working with a Third Generation (3G) network.

2. Related Technology

With the rise and development of WLAN technology, the main focus of current research is shifting to the interworking between WLANs and the global wireless mobile telecommunication systems like GSM, CDMA, WCDMA, TD-SCDMA, and CDMA2000. Among these systems, WCDMA and TD-SCDMA are standards for the Third Generation Partner Project (3GPP) while CDMA2000 is for the Third Generation Partner Project II (3GPP2).

The 3GPP standardization organization defines GERAN and UTRAN as the access network for GSM and UMTS, respectively, which can also be use for Location Services. A 3GPP network provides external LCS clients with the access of location services through the Gateway of Mobile Locating Center (GMLC). 3GPP defines a network architecture of the LCS. The network architecture has two modes depending on whether it can support roaming subscribers. See FIG. 1 for the LCS network architecture supporting non-roaming subscribers, and FIG. 2 for the architecture supporting roaming subscribers.

Referring to the LCS network architecture as shown in FIG. 1, a GMLC 101 allows an external LCS client 102 to make a location request for a certain mobile subscriber. If there is a location request for a certain mobile subscriber from an external LCS client, the GMLC 101 will first authenticate the mobile subscriber and make privacy verification through a privacy profile register (PPR) 103, which is connected with the GMLC via an interface Lpp 104. It then obtains via an interface Lh 105 the routing information of the mobile subscriber from a Home Location Register (HLR)/Home Subscriber Server (HSS) 106, and, forward via an interface Lg 107 the message of location request to the mobile subscriber according to the routing information of a $2^{nd}$-Generation Mobile Switching Center (2G-MSC) 108, a $2^{nd}$-Generation Serving GPRS Support Node (2G-SGSN) 109, a $3^{rd}$-Generation Servicing GPRS Support Node (3G-SGSN) 110, or a $3^{rd}$-Generation Mobile Services Switching Center Server (3G-MSC Server) 111, whichever covers the mobile subscriber at that time. The 2G-MSC 108, 2G-SGSN 109, 3G-SGSN 110, or 3G-MSC Server 111 will locate the mobile subscriber according to the received message of request for its location. The GMLC 101 will obtain the location result from the 2G-MSC 108, 2G-SGSN 109, 3G-SGSN 110, or 3G-MSC Server 111, and return it to the external LCS client 102.

The GMLC in the LCS network architecture as shown in FIG. 2 includes two parts, a Home Gateway Mobile Location Center (HGMLC) 201 and a Visiting Gateway Mobile Location Center (VGMLC) 207. The HGMLC 201 is the GMLC residing in the target mobile's home PLMN, which is responsible for the control of privacy checking of the target mobile in the 3GPP network. The VGMLC 207 is for storing the location information of the roaming mobile subscribers. The HGMLC 201 allows an external LCS client 202 to make a location request for a certain mobile subscriber. If an external LCS client makes a location request to the HGMLC 201 for a certain mobile subscriber, the HGMLC 201 will first authenticate the mobile subscriber and make privacy verification through a PPR 203, which is connected with the HGMLC via an interface Lpp 204. HGMLC 201 then obtains, via an interface Lh 205, the routing information of the mobile subscriber from an HLR/HSS 206, and forward the routing information of the mobile subscriber and location request for it to the VGMLC 207 which covers that mobile subscriber. The VGMLC 207 will send, according to the routing information of the mobile subscriber, via an interface Lg 208, the location request for the mobile subscriber to the 2G-MSC 209, 2G-SGSN 210, 3G-SGSN 211, or 3G-MSC Server 212, whichever covers the mobile subscriber at that time. A 2G-MSC 209, 2G-SGSN 210, 3G-SGSN 211, or 3G-MSC Server 212 will accomplish the location estimation for the mobile subscriber according to the received message of location request for it. The VGMLC 207 will obtain the location estimation result from the corresponding 2G-MSC 209, 2G-SGSN 210, 3G-SGSN 211, or 3G-MSC Server 212 and return it to the HGMLC 201, which will forward it to the external LCS client 202.

The 3GPP standardization organization also defines a simplified network architecture by which WLAN systems interwork with 3GPP systems. Refer to FIG. 3 for this architecture. The WLAN network includes a User Equipment (UE) 301, a WLAN access network 302, and a 3GPP Authentication, Authorization and Accounting (AAA) Server 303. The WLAN access network is connected with the UE 301, the 3GPP AAA Server 303, and an external Internet/Intranet 304, respectively. The WLAN access network 302 interworks with an IP layer of the 3GPP network via the 3GPP AAA Server 303. The 3GPP AAA Server 303 conducts access control on the mobile subscribers while an HLR 305 or HSS 306 provides the mobile subscriber's profile and security information, an On-line Charging System (OCS) 307 provides the function of on-line charging, a Charging Gateway/Charging Collection Function (CGw/CCF) 308 provides the function of off-line charging, and a Packet Data Gateway 309 bears the data of the WLAN.

In accordance with the provisions in 3GPP TS22.934 on the inter-working of Packet Switching (PS) domain service, WLAN subscribers accessing a 3GPP network are permitted to apply for PS domain service, which includes LCS service. In another patent application of the present assignee, a subscriber-location system and method thereof applicable to WLANs have been given. The subject application puts forward a location system in a WLAN and the solution to locating WLAN subscribers in the WLAN. To be specific, a location subsystem is preset in the WLAN and this subsystem will detect, verify, store, and convert the WLAN subscribers' location information. The location information of each WLAN subscriber is provided by its access point in the WLAN, with the identification of access point used as the location information of the WLAN subscriber. Based on the said application, a subscriber can be located in the WLAN. When a client is requesting for the location information of a certain WLAN subscriber, this location subsystem will provide the appropriate location information.

Although it is possible for the current WLANs to locate its subscribers, when a certain network entity in the 3GPP network needs to obtain the location information of WLAN subscribers, it is not possible for external LCS clients to use the LCS service in the WLAN through the 3GPP network inter-working with the WLAN. This is because the 3GPP standardization organization does not provide the connection and interface standards between GMLC and WLAN. That is to say, current 3GPP provide LCS only for GSM and UMTS but not for locating WLAN subscribers, which makes it impossible for a 3GPP network to interact with the location system in the WLAN.

SUMMARY OF THE INVENTION

In view of the above, the invention provides a method of providing location service for WLAN subscribers, so that LCS clients can use the LCS of a WLAN inter-working with a 3G network.

Accordingly, the invention provides a method of providing location service for WLAN subscribers, with a location subsystem preset in a WLAN and, when WLAN subscribers are connected with a 3G network, which comprises at least the steps of:

a) the WLAN location subsystem detecting whether there is a location request from a Location Service (LCS) client in the 3G network, if yes, go to Step b), otherwise repeat Step a);

b) the WLAN location subsystem locating the targeted User Equipment (UE) based on the received location request and returning a location result to a Gateway Mobile Location Center (GMLC);

c) the GMLC forwarding the location result to the LCS client.

Preferably, the WLAN location subsystem and the GMLC are connected with an Authentication, Authorization, Accounting (AAA) Server, respectively, the method further comprises before Step a):

a1) the LCS client sending the location request to the AAA Server;

a2) the AAA Server obtaining the subscription information related to LCS of the target UE, herein after refers subscription LCS information, and deciding whether the target UE can be located based on the subscription LCS information; if yes, go to Step a3), otherwise returning to the LCS client the location result with error information, and ending;

a3) the AAA Server detecting whether the target UE is in idle state, if not, sending the location request to the WLAN location subsystem and go to Step a), otherwise go to Step a4);

a4) the AAA Server further detecting whether there has been the location result corresponding to the target UE in the WLAN subsystem, if yes, going to Step a5), otherwise sending the location request to the WLAN subsystem and going to Step a);

a5) the AAA Server detecting whether it is permitted to return the location result of the target UE in the WLAN location subsystem to the GMLC, if yes, returning the location result to the LCS client via the GMLC and then ending, otherwise sending the location request to the WLAN location subsystem and going to Step a);

further, in Step b) before the WLAN location subsystem locates the target UE based on the received location request, the WLAN location subsystem detecting whether there is any location results of the target UE in it, if not, performing the step to locate the target UE, storing the location result obtained, then performing the step of returning the location result to the GMLC, otherwise obtaining the result existing already in itself and performing the step of returning the location result to the GMLC;

wherein the WLAN location subsystem returning the location result to the GMLC which comprises the WLAN location subsystem sending via the AAA Server the location result corresponding to the targeted UE to the GMLC.

Preferably, the AAA Server obtaining the subscription LCS information in Step a2) comprises the subscription LCS information being obtained from a Home Location Register (HLR) or a Home Subscriber Server (HSS).

Preferably, the WLAN subscribers are roaming ones; the GMLC in the 3G network comprises a Visiting Gateway Mobile Location Center (VGMLC) and a Home Gateway Mobile Location Center (HGMLC); the AAA Server is connected with the VGMLC;

the step of the AAA Server sending the location result to the GMLC comprises the location result of the target UE being sent to the HGMLC via the VGMLC; and, the step of the GMLC sending the location result to the LCS client comprises the location result of the target UE being sent to the LCS client via the HGMLC.

In one embodiment, the LCS client is an external LCS client; the step of the LCS client sending the location request to the AAA Server comprises the external LCS client sending the location request to the GMLC; the GLMC, after receiving the location request, obtaining the routing information of the target UE and sending the location request to the corresponding AAA Server based on the routing information.

In another embodiment, the LCS client is a 3G network; the step of the LCS client sending the location request to the AAA Server comprises the 3G network sending the location request to the GMLC; the GMLC, after receiving the location request from the 3G network, obtaining the routing information of the target UE and sending the location request to the corresponding AAA Server based on the routing information.

Preferably, the step of the GMLC obtaining the routing information of the target UE comprises the routing information of the target UE obtained from the Home Location Register or the Home Subscriber server.

In another embodiment, the LCS client is a WLAN subscriber, and the LCS client sending the location request to the AAA Server comprises the WLAN subscriber initiating the location request to the AAA Server via the WLAN network.

Preferably, the AAA Server in the Step a5) detects whether it is permitted to feed back the location result of the target UE in the WLAN location subsystem to the GMLC which comprises the AAA Server detecting whether it is permitted to return the last location result of the target UE in the WLAN location subsystem to the GMLC according to the subscription LCS information obtained in Step a2).

The interface between the GMLC and the AAA Server may conform to the Mobile Application Part (MAP) protocol.

In another embodiment, this method may comprise further before step c) the step of the GMLC sending an acknowledgement to the AAA Server.

Preferably, the WLAN location subsystem is directly connected with the GMLC, and the method further comprises before Step a), the step of the LCS client sending the location request to the GMLC, GMLC then directly sending the received location request to the WLAN location subsystem.

The WLAN location subsystem may be connected with the AAA Server; and the method may further comprise in Step b), the WLAN location subsystem, before locating, obtains from the AAA Server location parameters used for locating.

The invention, by defining the connection and interface between the AAA Sever and the GMLC and between the AAA Server and the WLAN location system, or the connection and interface between the GMLC and the WLAN location system, makes it possible for the WLAN subscribers inter-working with the 3G network to apply the LCS, thus, making it possible for a 3GPP network to interact with the location system in the WLAN.

EMBODIMENTS OF THE INVENTION

The following is a detailed description of the invention with reference to the accompanying drawings and a detailed embodiment.

The invention is based on presetting a location subsystem in a WLAN with the major process of implementation as follows: with the WLAN subscribers accessing to a 3G network, the location subsystem of the WLAN, after receiving a location request from an LCS client in the 3G network, locates the WLAN subscriber based on the location request and returns the location result to the GMLC, which forwards it to the LCS client.

In an exemplary embodiment, the subscribers of a WLAN access to a 3GPP network while the Wireless Local Area Network Serving Mobile Location Center (WLAN-SMLC) is set as the location subsystem in the WLAN. The WLAN-SMLC described herein is a location subsystem in the WLAN which is designed to manage the mobility of a location measure unit, coordinate and dispatch resources needed for location measurement, conduct location calculation, and complete calculation of location information. The AAA Server in this exemplary embodiment is a 3GPP AAA Server, an interface L's is set between the WLAN-SMLC and the 3GPP AAA Server and an interface L'b is set between the WLAN-SMLC and the WLAN. The WLAN-SMLC may obtain parameters needed for locating from the 3GPP AAA Server before the locating operation. In addition, an interface is also set in the invention between the 3GPP network and the WLAN. In this exemplary embodiment another interface Lg is set between the GMLC and the 3GPP AAA Server, conforming to the MAP protocol. The WLAN-SMLC may be set separately as an independent entity; or set within the 3GPP AAA Server with the interface between WLAN-SMLC and the 3GPP AAA Server being an internal one; or set within any network entity of the WLAN. The WLAN-SMLC receives location service requests from the GMLC, conducts locating operation for mobile subscribers, and returns the location result in the standard format of location information to the GMLC.

Figure 1:
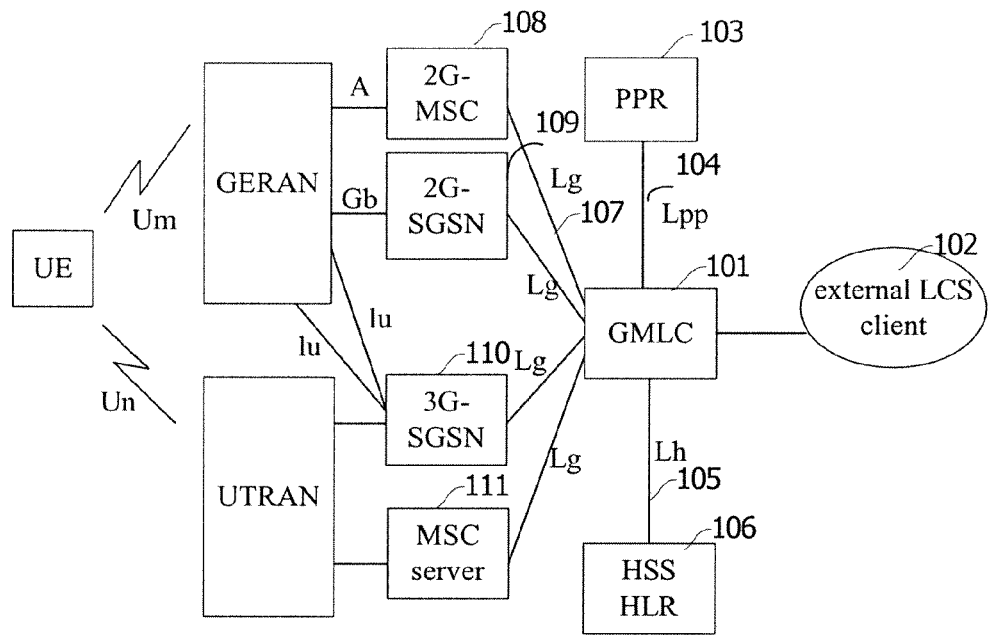
FIG. 1 shows an LCS network architecture in prior art accommodating non-roaming subscribers.
Figure 2:
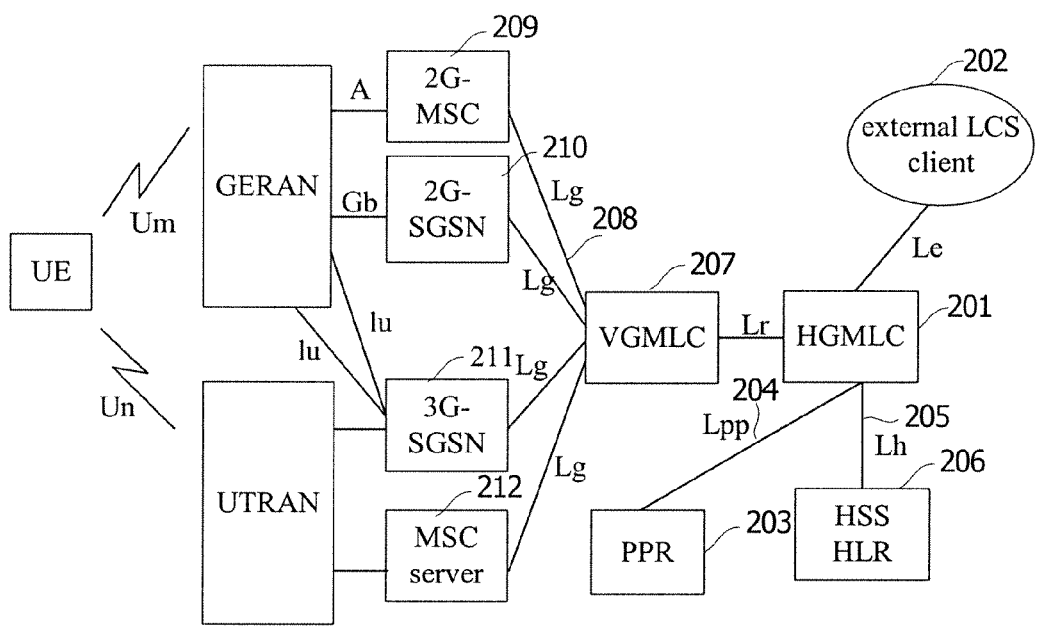
FIG. 2 shows an LCS network architecture in the prior art accommodating roaming subscribers.
Figure 3:
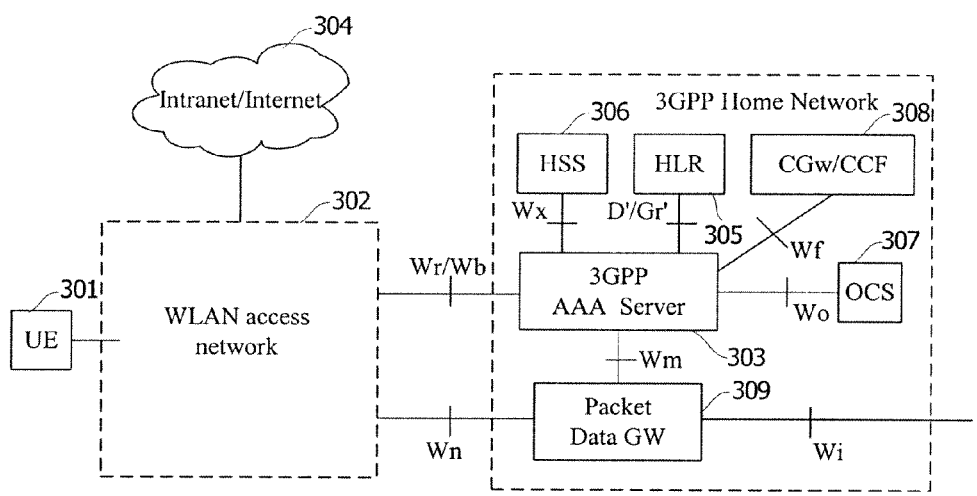
FIG. 3 shows a simplified network structure given by the 3GPP standardization organization for interworking WLAN and 3GPP network.
Figure 4:
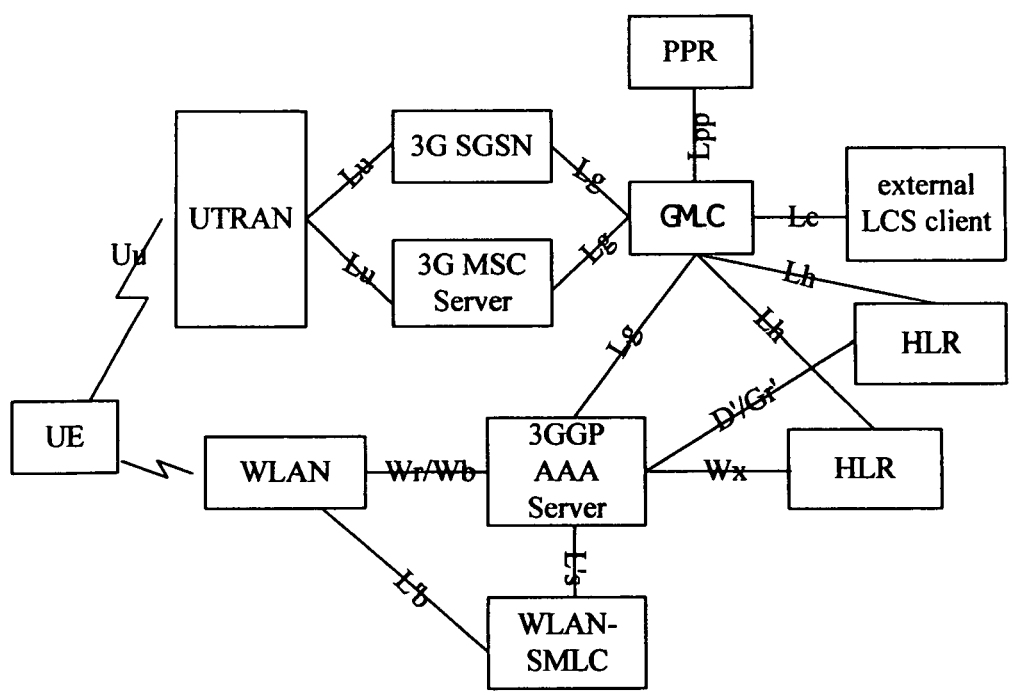
FIG. 4 shows the network architecture given in the invention accommodating non-roaming subscribers for LCS in terms of inter-working between a WLAN and a 3GPP network.
Figure 5:
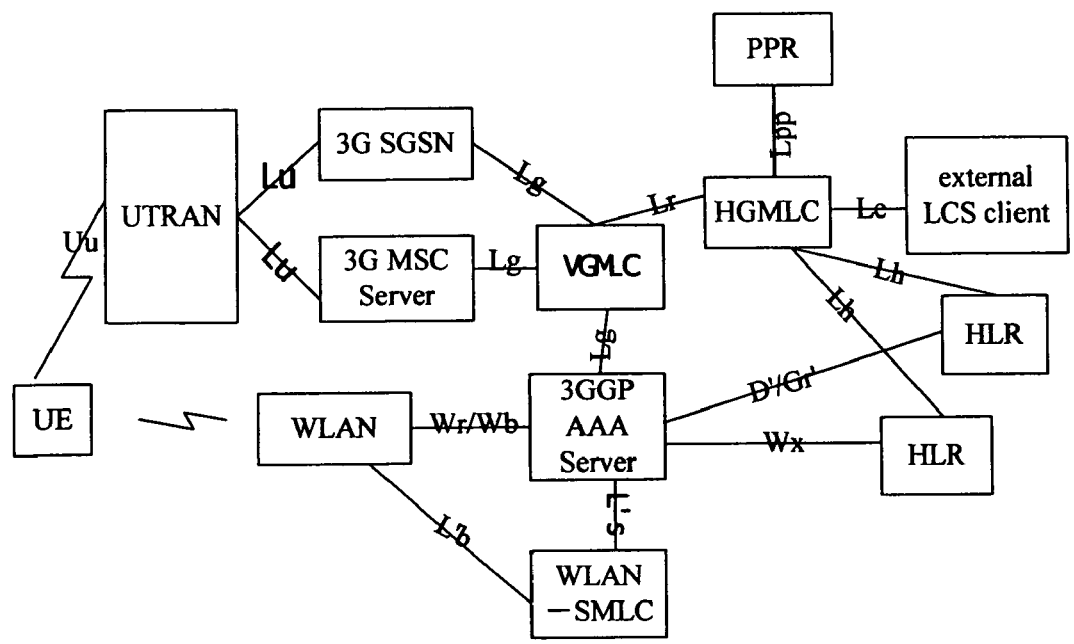
FIG. 5 shows the network architecture defined in the invention accommodating roaming subscribers for LCS in terms of inter-working between a WLAN and a 3GPP network.

See FIG. 4 and FIG. 5 for the network architecture with the WLAN-SMLC and the interfaces added. Shown in FIG. 4 is the network architecture accommodating non-roaming subscribers for LCS in terms of inter-working between a WLAN and a 3GPP network. FIG. 5 shows the network architecture accommodating roaming subscribers for LCS in terms of inter-working between a WLAN and a 3GPP network.

Figure 6:
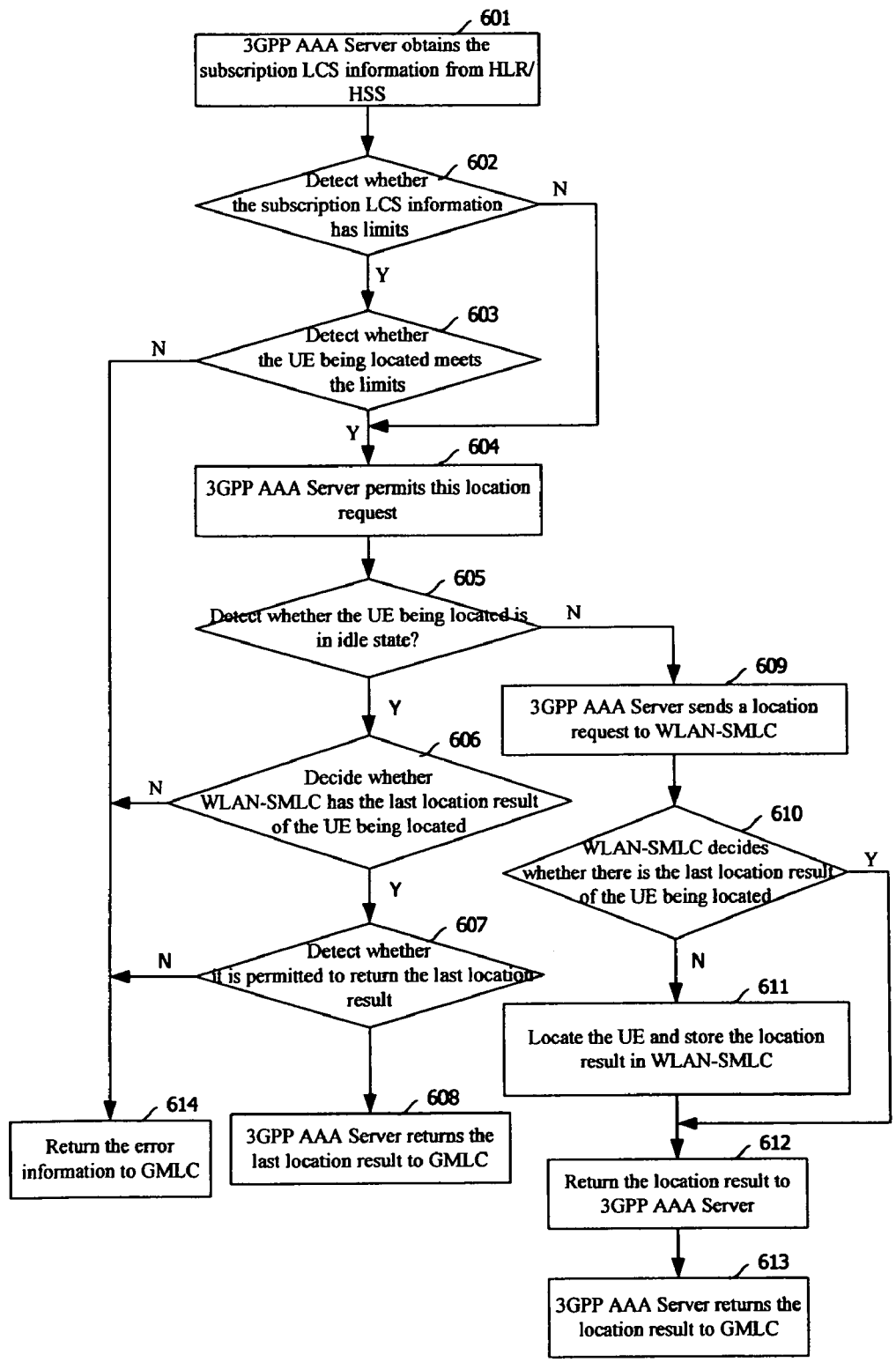
FIG. 6 shows a flow diagram in the invention accommodating non-roaming subscribers of the operations of the 3GPP AAA Server to locate a WLAN subscriber after receiving a location request.

For the network architecture accommodating non-roaming subscribers as shown in FIG. 4, in case that the 3GPP AAA Server receives a message requesting to locate a certain WLAN subscriber, see FIG. 6 for the flow diagram to locate the WLAN subscriber. Correspondingly, the steps needed to locate the WLAN subscriber are:

In steps 601-603, the 3GPP AAA Server obtains subscription LCS information from the HLR or HSS and detects whether there are limits set in the subscription LCS information. If there is no limit set by the subscription LCS information as stored in the HLR or HSS, go to Step 604; otherwise, it detects whether the UE (i.e. WLAN subscriber) is located meets the limits, if the UE being located does not meet the limits, go to Step 614; if it meets the limits, go to Step 604.

In steps 604-606, the 3GPP AAA Server permits this location request and detects whether the UE being located is in idle state, if it is not idle, go to Step 609; if it is idle, it detects further whether there is the last location result for the UE being located existing in the WLAN-SMLC. If there is a result, go to Step 607, otherwise go to Step 614.

In step 607, the 3GPP AAA Server obtains the subscription LCS information from the HLR or HSS and detects according to the obtained information whether it is permitted to return to the GMLC the last location result of the UE being located in the WLAN-SMLC. If permitted, go to Step 608, otherwise, go to Step 614.

In step 608, the 3GPP AAA Server obtains the location result from the WLAN-SMLC, and returns it to the GMLC, which then forwards the result to the LCS client. Then the flow is over.

In steps 609-611, the 3GPP AAA Server sends a location request to the WLAN-SMLC, which, after receiving the request, detects whether there is in the WLAN-SMLC the last location result of the UE being located. If no, the WLAN-SMLC locates the UE via the WLAN, stores the location result in the WLAN-SMLC, and then goes to Step 612; otherwise, go directly to Step 612. The location result stored in the WLAN-SMLC is in the standard format of location information.

In steps 612-613, the WLAN-SMLC sends the location result of the located UE stored in it to the 3GPP AAA Server. The 3GPP AAA Server sends the location result to the GMLC, which forwards the result to the LCS client.

In step 614, the 3GPP AAA Server returns via the GMLC the location result with error information to the LCS client and then the flow ends.

In case of a network architecture accommodating roaming subscribers as shown in FIG. 5, since GMLC comprises an HGMLC connected with external LCS clients and a VGMLC connected with the 3GPP AAA Server, the GMLC connected with the 3GPP AAA Server in the locating process as shown in FIG. 4 shall be changed to VGMLC, via which interactions are made with the 3GPP AAA Server. The VGMLC sends the location result to the HGMLC, which forwards it to the external LCS client.

By means of the above method for locating WLAN subscribers, when WLAN subscribers access to a 3GPP network via the WLAN, via the 3GPP network LCS clients can use the LCS of the WLAN which inter-works with the 3GPP network. The LCS service includes a Mobile Terminated (MT) LCS, that is, an external LCS client makes an inquiry of the current location of a WLAN subscriber; a Network Initiated (NI) LCS, that is, the 3GPP network requests to inquire on the current location of a WLAN subscriber; and a Mobile Originated (MO) LCS, that is, a WLAN subscriber makes inquiry of its own location. Given below is the description of the process of LCS service for WLAN subscribers under the conditions accommodating non-roaming subscribers.

Figure 7:
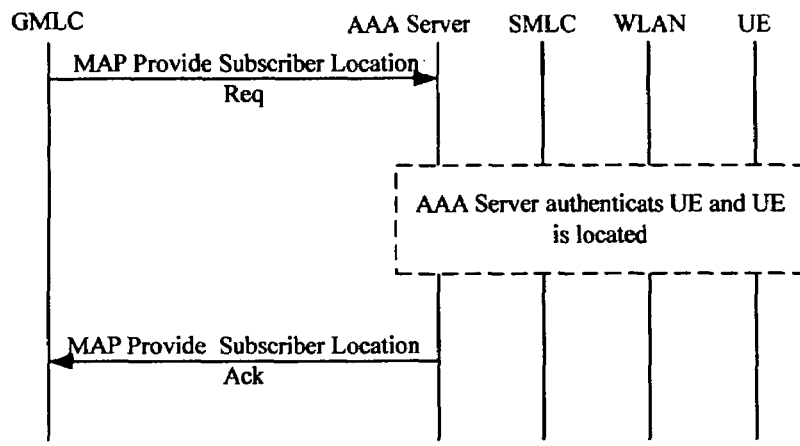
FIG. 7 shows the message flow diagram in the invention accommodating non-roaming subscribers for the GMLC to obtain the location result based on the Mobile Terminated (MT) LCS.

For the Mobile Terminated (MT) LCS, the message flow where the GMLC obtains the location result is shown as FIG. 7. If an external LCS client needs to inquire on the location of a WLAN subscriber, it first sends a location request to the GMLC. After receiving the location request, from the HLR or HSS the GMLC obtains the routing information of the UE being located, then sends a message of MAP Provide Subscriber Location Req according to the obtained routing information to the corresponding 3GPP AAA Server. After receiving this message of MAP Provide Subscriber Location Req, the 3GPP AAA Server obtains the location result of the WLAN subscriber by completing the process shown in FIG. 6. The 3GPP AAA Server then returns to the GMLC the location result or error message by sending the message of MAP Provide Subscriber Location Ack. The GMLC forwards the location result or error message it has received to the external LCS client.

The message of MAP Provide Subscriber Location Req should include information such as the location type, the International Mobile Subscriber Identification (IMSI) of the subscriber, the Quality of Service (QoS) and the identification of the external LCS client, among which QoS includes accuracy, responding time, etc. The message of MAP Provide Subscriber Location Ack should include such information as the IMSI and the locating result.

When the 3GPP network makes an inquiry of the location of a WLAN subscriber, it sends a location request to the GMLC, which, after receiving the location request from the 3GPP, obtains the routing information of the UE to be located, and sends a message of location request to the corresponding 3GPP AAA Server according to the routing information.

Figure 8:
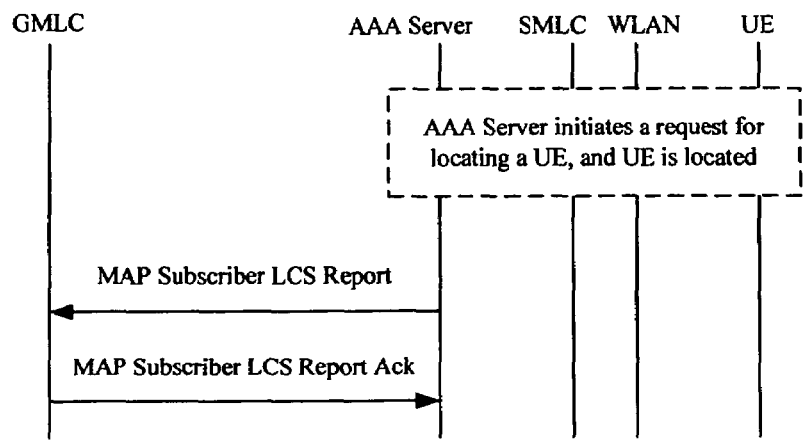
FIG. 8 shows the message flow diagram in the invention accommodating non-roaming subscribers for the GMLC to obtain the location result based on Network Initiated (NI) LCS.

For the Network Initiated (NI) LCS, the message flow where the GMLC obtains the location result is as shown in FIG. 8. If a 3GPP network needs to inquire on the location of a WLAN subscriber, it sends a location request to the GMLC. After receiving the location request from the 3GPP network, the GMLC also obtains the routing information of the UE being located from the HLR or HSS, and sends a message of location request to the corresponding 3GPP AAA Server according to the routing information. After receiving the locating instruction, the 3GPP AAA Server obtains the location result of the WLAN subscriber by means of the process shown in FIG. 6, then sends the location result or error message to the GMLC via the message of MAP Subscriber LCS Report. The GMLC returns the message of MAP Subscriber LCS Report Ack to acknowledge the message sent by the 3GPP AAA Server, then forwards the received locating result or error information to the 3GPP network.

The message of MAP Subscriber LCS Report should include parameters like the IMSI or MSISDN of the located UE, identification of the LCS client, and reason for network initiating locating. It should also include the appropriate location result or error information. The message of MAP Subscriber LCS Report Ack should include information like IMSI and location result.

Figure 9:
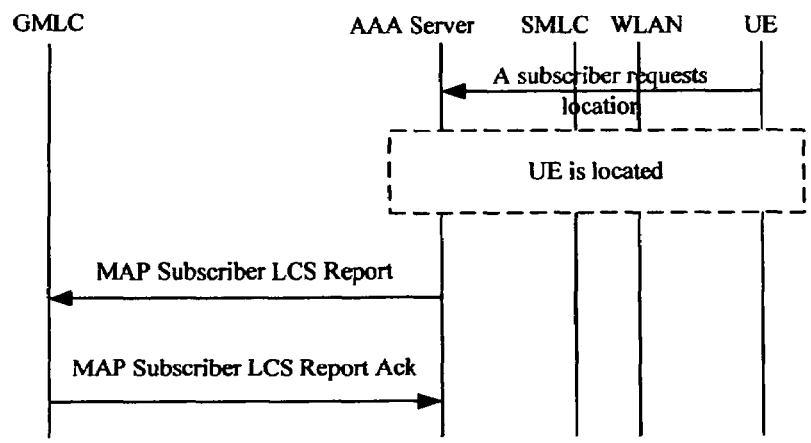
FIG. 9 shows the message flow diagram in the invention accommodating non-roaming subscribers for the GMLC to obtain the location result based on the Mobile Originated (MO) LCS.

For the Mobile Originated (MO) LCS, the message flow where the GMLC obtains the location result is shown as FIG. 9, which is similar to the situation of the Network Initiated (NI) LCS. The difference is that, if it is a WLAN subscriber that needs to inquire on its own location, the WLAN subscriber initiates a location request via the WLAN access network to the 3GPP AAA Server, and finally the GMLC sends the received location result or error information to the WLAN subscriber.

The description above is about the LCS provided with the GMLC being connected with the 3GPP AAA Server while the 3GPP AAA Server is connected with the WLAN-SMLC. It is also possible to connect the GMLC directly with the WLAN-SMLC. In that case, if an LCS client initiates a location request to the GMLC, the GMLC will forward the location request directly to the WLAN-SMLC, which, after completing the locating operation, will return the location result to the GMLC, which will finally send the location result to the LCS client. The LCS client herein mentioned may as well be external LCS clients, 3GPP network or WLAN subscribers. It is also possible to connect the WLAN-SMLC with the 3GPP AAA Server so that the WLAN-SMLC can obtain from the 3GPP AAA Server those parameters needed for locating.

With the method provided by the invention, when WLAN subscribers have accessed to a 3GPP network, LCS clients will apply via the 3GPP network to the LCS of the WLAN inter-working with the 3GPP network.

What is described above is only a preferable exemplary embodiment of the invention, not to limit the scope of protection.

The invention claimed is:

1. A method of providing location service for Wireless Local Area Network (WLAN) subscribers with a location subsystem preset in a WLAN and the WLAN subscribers having access to a $3^{rd}$ Generation (3G) network via the WLAN location subsystem, the method comprising:

a) the WLAN location subsystem detecting whether a location request is received from a Location Service (LCS) client in the 3G network, if yes, going to b), otherwise repeating a);

b) the WLAN location subsystem locating a target User Equipment (UE) in the WLAN based on the received location request and returning a location result of the target UE in the WLAN to a Gateway Mobile Location Center (GMLC);

c) the GMLC forwarding the locating result to the LCS client;

wherein the WLAN location subsystem and the GMLC are connected with an Authentication, Authorization, Accounting (AAA) Server, respectively, the method further comprising before a):

a1) the LCS client sending the location request to the AAA Server;

a2) the AAA Server obtaining a subscription LCS information of the target UE, and detecting whether the target UE is permitted to be located based on the subscription LCS information; if yes, going to a3), otherwise returning to the LCS client the location result with error information, and ending;

a3) the AAA Server detecting whether the target UE is in an idle state, if not, sending the location request to the WLAN location subsystem and going to a), otherwise going to a4);

a4) the AAA Server further detecting whether there has been the location result corresponding to the target UE in the WLAN location subsystem, if yes, going to a5), otherwise sending the location request to the WLAN location subsystem and going to a);

a5) the AAA Server detecting whether the AAA Server is permitted to return the location result of the target UE in the WLAN location subsystem, if yes, returning the location result to the LCS client via the GMLC and then ending, otherwise returning to the LCS client the location result with error information, and ending; and, further comprising in b) before the WLAN location subsystem locates the target UE based on the received location request, the WLAN location subsystem detecting whether there has been the location result of the target UE in the WLAN, if not, locating the target UE, storing the location result obtained, then returning the location result to the GMLC, otherwise obtaining the location result existing already in the WLAN location subsystem and returning the location result to the GMLC;

wherein the WLAN location subsystem returning the location result to the GMLC comprises the WLAN location subsystem sending via the AAA Server the location result corresponding to the target UE to the GMLC.

2. A method according to claim 1, wherein the AAA Server obtaining the subscribing location information in a2) comprises obtaining the subscription LCS information from a Home Location Register (HLR) or a Home Subscriber Server (HSS).

3. A method according to claim 1, wherein the WLAN subscribers are roaming ones; the GMLC in the 3G network comprises a Visiting Gateway Mobile Location Center (VGMLC) and a Home Gateway Mobile Location Center (HGMLC); and the AAA Server is connected with the VGMLC;

wherein the AAA Server sending the location result to the GMLC comprises sending the location result of the target UE to the HGMLC via the VGMLC; and wherein the GMLC sending the location result to the LCS client comprises sending the location result of the target UE to the LCS client via the HGMLC.

4. A method according to claim 1, wherein the LCS client is an external LCS client; the LCS client sending the location request to the AAA Server comprises the external LCS client sending the location request to the GMLC; and the GLMC, after receiving the location request, obtaining the routing information of the target UE and sending the location request to the corresponding AAA Server based on the routing information.

5. A method according to claim 1, wherein the LCS client is a 3G network; the LCS client sending the location request to the AAA Server comprises the 3G network sending the location request to the GMLC; and the GMLC, after receiving the location request from the 3G network, obtaining the routing information of the target UE and sending the location request to the corresponding AAA Server based on the routing information.

6. A method according to claim 4, wherein the GMLC obtaining the routing information of the target UE comprises obtaining the routing information of the target UE from a Home Location Register (HLR) or a Home Subscriber Server (HSS).

7. A method according to claim 1, wherein the LCS client is a WLAN subscriber; and the LCS client sending the location request to the AAA Server comprises the WLAN subscriber initiating the location request to the AAA Server via the WLAN.

8. A method according to claim 1, wherein the AAA Server in a5) detecting whether the AAA server is permitted to return the location result of the targeted UE in the WLAN location subsystem to the GMLC comprises the AAA Server detecting whether the AAA server is permitted to return the last location result of the target UE in the WLAN location subsystem to the GMLC according to the subscribing location information obtained in a2).

9. A method according to claim 1, wherein the interface between the GMLC and the AAA Server conforms to a Mobile Application Part (MAP) protocol.

10. A method according to claim 1, further comprising before c): the GMLC sending a message of acknowledgement to an Authentication, Authorization, Accounting (AAA) Server.

11. A method according to claim 1, wherein the WLAN location subsystem is connected with an Authentication, Authorization, Accounting (AAA) Server; and in b), the WLAN location subsystem, before the locating operation, obtaining from the AAA Server a location parameter used for locating.

12. A method according to claim 5, wherein the GMLC obtaining the routing information of the target UE comprises of obtaining the routing information of the target UE from a Home Location Register (HLR) or a Home Subscriber Server (HSS).

13. A system for providing location service for Wireless Local Area Network (WLAN) subscribers and the WLAN subscribers having access to a $3^{rd}$ Generation (3G) network, the system comprising:

a WLAN location subsystem preset in a WLAN;

a Location Service (LCS) client is operable for initiating a location request in the 3G network;

a Gateway Mobile Location Center (GMLC), the GMLC is operable for forwarding a locating result to the LCS client; and wherein the WLAN location subsystem is operable to detect whether the location request is received from the LCS client, the WLAN location subsystem locates a target User Equipment (UE) in the WLAN based on the received location request and returns the location result of the target UE in the WLAN to the GMLC;

an Authentication Authorization Accounting (AAA) Server connected with the WLAN location subsystem and the GMLC respectively;

wherein the AAA Server is operable for:

receiving the location request sent by the LCS client;

obtaining a subscription LCS information of the target UE and detecting whether the target UE is permitted to be located based on the subscription LCS information;

if the target UE is not permitted to be located, returning to the LCS client the location result with error information, and ending;

detecting whether the target UE being permitted to be located is in an idle state, otherwise sending the location request to the WLAN location subsystem if the target UE being permitted to be located is not in the idle state;

detecting whether there has been the location result corresponding to the target UE in the WLAN location subsystem if the target UE is in the idle state;

returning to the LCS client the location result with error information, and ending if there is no location result corresponding to the target UE;

detecting whether the AAA Server is permitted to return the location result of the target UE in the WLAN location subsystem if there has been the location result corresponding to the target UE;

returning the location result to the LCS client via the GMLC, and then ending if the AAA Server is permitted to return the location result of the target UE; and returning to the LCS client the location result with error information, and ending if the AAA Server is not permitted to return the location result of the target UE;

wherein the WLAN location subsystem is further operable for detecting whether there has been the location result of the target UE in the WLAN, if not, locating the target UE, storing the location result obtained, then sending via the AAA Server the location result corresponding to the target UE to the GMLC; otherwise obtaining the location result existing already in the WLAN location subsystem and sending via the AAA Server the location result corresponding to the target UE to the GMLC.

14. A system according to claim 13, wherein the WLAN location subsystem is connected with an Authentication, Authorization, Accounting (AAA) Server and the WLAN location subsystem is further operable for obtaining from the AAA Server a location parameter used for locating.

\* \* \* \* \*